United States Patent
Kim

(10) Patent No.: US 9,783,178 B2
(45) Date of Patent: Oct. 10, 2017

(54) MOTOR INITIALIZATION METHOD AND APPARATUS FOR ELECTRIC BOOSTER BRAKE SYSTEM

(71) Applicant: HYUNDAI MOBIS CO., LTD., Seoul (KR)

(72) Inventor: Do Kun Kim, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 149 days.

(21) Appl. No.: 14/202,614

(22) Filed: Mar. 10, 2014

(65) Prior Publication Data
US 2015/0019096 A1 Jan. 15, 2015

(30) Foreign Application Priority Data
Jul. 12, 2013 (KR) .................. 10-2013-0082472

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| B60T 13/74 | (2006.01) |
| B60T 7/04 | (2006.01) |
| B60T 7/14 | (2006.01) |
| B60T 17/22 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| G08G 1/00 | (2006.01) |

(52) U.S. Cl.
CPC .............. *B60T 13/74* (2013.01); *B60T 7/042* (2013.01); *B60T 7/14* (2013.01); *B60T 17/221* (2013.01)

(58) Field of Classification Search
CPC ..... B60T 13/74; B60T 13/745; B60R 16/023; F15B 15/02
USPC .......................... 701/70, 22; 340/901; 60/327
See application file for complete search history.

(56) References Cited

U.S. PATENT DOCUMENTS

| | | | | |
|---|---|---|---|---|
| 6,289,271 | B1 * | 9/2001 | Isono | B60T 7/042 303/122.12 |
| 2011/0193721 | A1 * | 8/2011 | Koie | B60R 25/00 340/901 |

(Continued)

FOREIGN PATENT DOCUMENTS

| | | |
|---|---|---|
| CN | 1490194 A | 4/2004 |
| CN | 102224044 A | 10/2011 |

(Continued)

OTHER PUBLICATIONS

Office Action dated Apr. 6, 2016 of corresponding Chinese Patent Application No. 2014-10101807.4—8 pages.

*Primary Examiner* — Mahmoud Ismail
(74) *Attorney, Agent, or Firm* — Knobbe Martens Olson & Bear LLP

(57) ABSTRACT

A motor initialization method for an electric booster brake system may include: determining, by a control unit, whether a key on signal of a vehicle is inputted; turning on a warning light and determining a battery voltage state of the vehicle, when the key on signal is inputted; and performing a motor initialization mode according to the determined battery voltage state.

10 Claims, 3 Drawing Sheets

(56) References Cited

U.S. PATENT DOCUMENTS

| | | | | |
|---|---|---|---|---|
| 2011/0246039 A1* | 10/2011 | Takeda | ............ | B60T 13/741 701/70 |
| 2013/0226377 A1* | 8/2013 | Stanek | ............ | H02J 7/0047 701/22 |
| 2014/0202145 A1* | 7/2014 | Kuramochi | ......... | B60T 13/745 60/327 |

FOREIGN PATENT DOCUMENTS

| | | | |
|---|---|---|---|
| CN | 102774371 A | 11/2012 | |
| KR | 10-2013-0033189 A | 4/2013 | |

\* cited by examiner

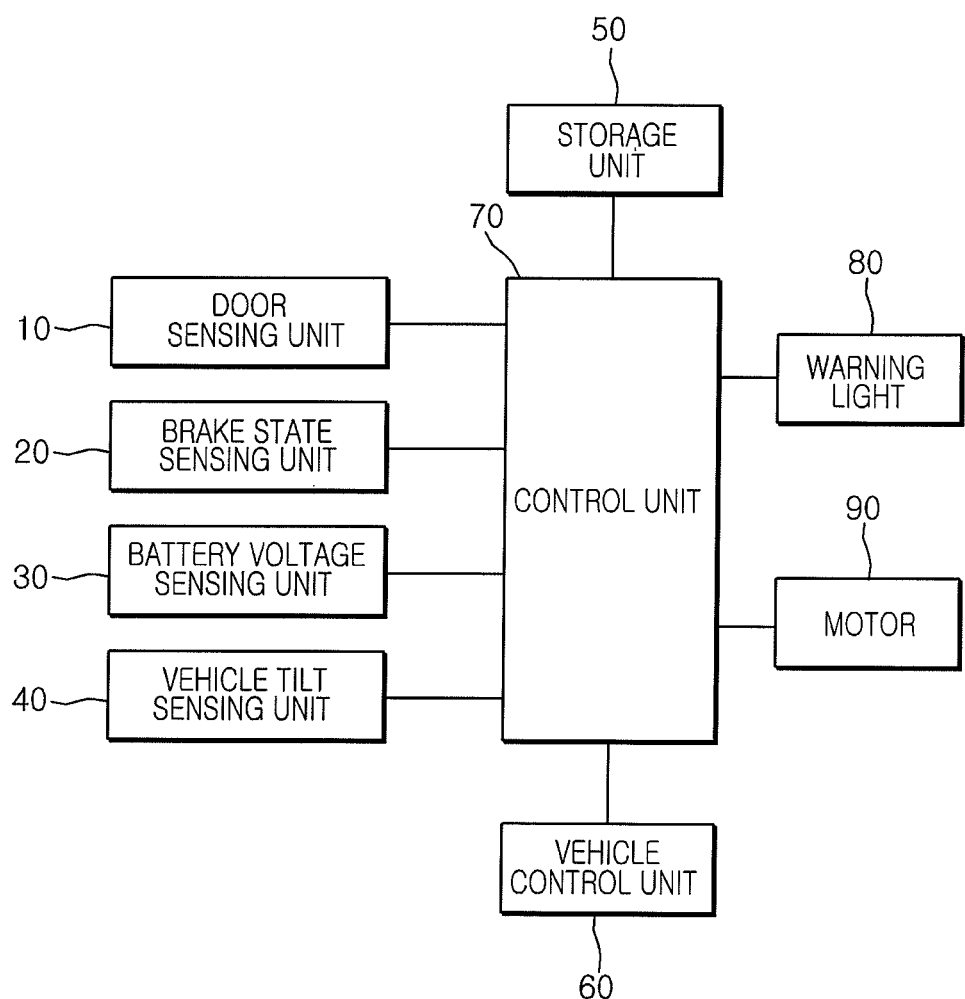

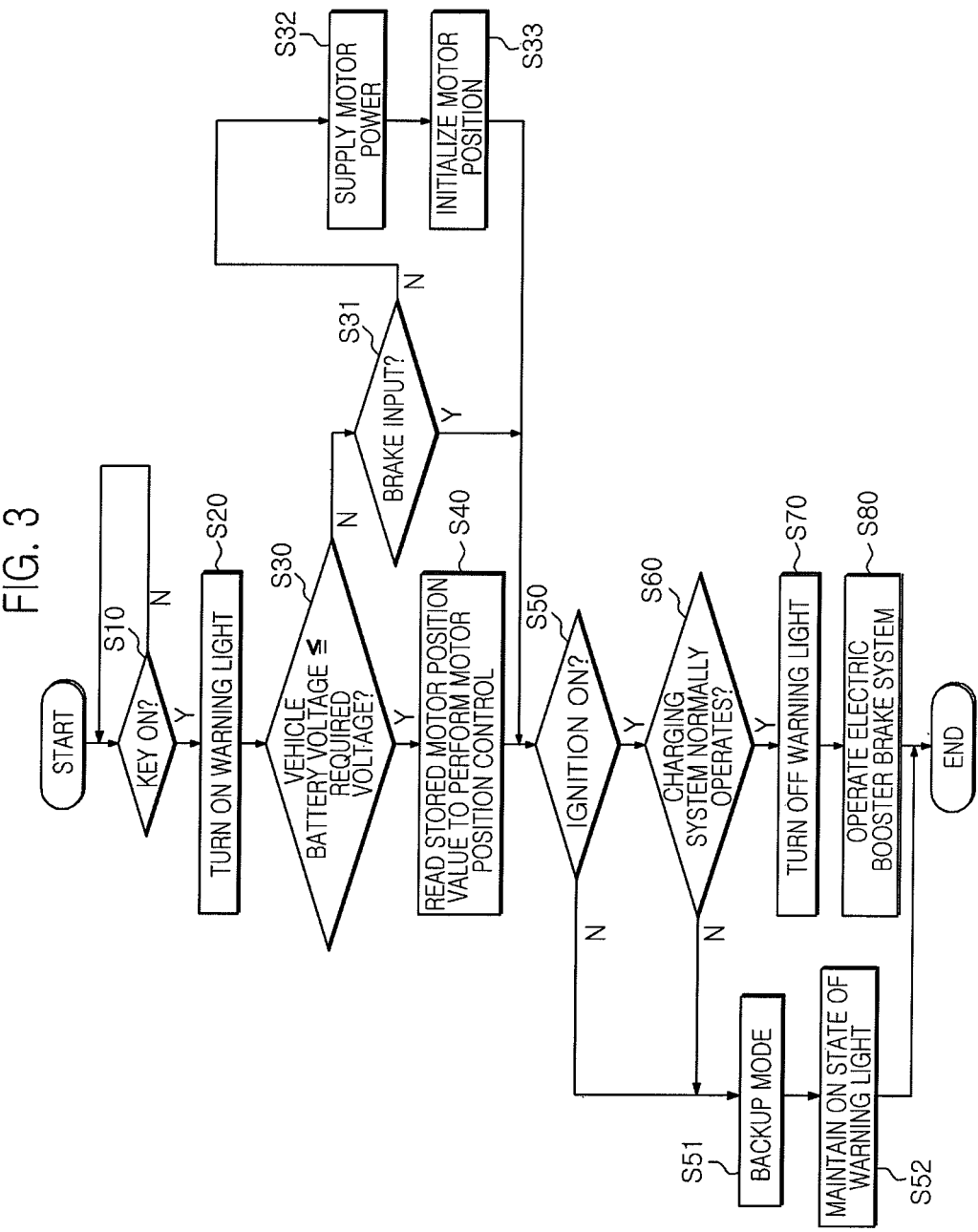

MOTOR INITIALIZATION METHOD AND APPARATUS FOR ELECTRIC BOOSTER BRAKE SYSTEM

CROSS-REFERENCES TO RELATED APPLICATIONS

The present application claims priority to Korean application number 10-2013-0082472, filed on Jul. 12, 2013, which is incorporated by reference in its entirety.

BACKGROUND OF THE INVENTION

The present invention relates to a motor initialization method and apparatus for an electric booster brake system, and more particularly, to a motor initialization method and apparatus for an electric booster brake system, which is capable of minimizing the consumption of current applied to a motor by applying a different motor initialization mode depending on a battery voltage state, when the electric booster brake system is operated.

In general, a brake system of a vehicle is used to decelerate or stop a traveling vehicle and simultaneously maintain a parking state.

Such a brake system may be classified into a main brake used for decelerating or stopping the vehicle and a parking brake used for maintaining the vehicle in a parking state.

The main brake may be classified into a mechanical brake, a hydraulic brake, and a pneumatic brake, depending on a mechanism that transmits a pedal force, generated when a driver steps on a pedal, to each wheel. Among the brakes, the hydraulic brake has an advantage in that it may reduce a frictional loss and a manipulation force because a braking force is uniformly transmitted to each wheel. Thus, the hydraulic brake is widely used.

The hydraulic brake may include a direct-type hydraulic brake and an electric booster brake. The direct-type hydraulic brake may directly transmit a pedal force, generated when a user steps on a brake pedal, to each wheel. The electric booster brake may boost a pedal force using air pressure or negative pressure caused by vacuum, and transmit the boosted pedal force to each wheel. Between the hydraulic brakes, since the electric booster brake can exhibit a large braking force through a relatively small force, the use of the electric booster brake has recently become more common.

Such an electric booster brake must receive power for driving a motor through a battery. However, when the electric booster brake additionally consumes the maximum current for motor initialization in a state where power enough to drive the motor is not supplied because the vehicle has not been used for a long time, the state of the battery may become worse to cause a system defect. At this time, as the motor initialization is not normally performed, the situation may become more serious, for example, the vehicle may not be started.

The related art of the present invention is disclosed in Korean Patent Laid-open Publication No. 10-2013-0033189 published on Apr. 3, 2013 and entitled "Apparatus and method for controlling power supply of smart booster brake system".

SUMMARY OF THE INVENTION

An embodiment of the present invention is directed to a motor initialization method and apparatus for an electric booster brake system, which applies a different motor initialization mode depending on a battery voltage state when the electric booster brake system is operated, thereby minimizing the consumption of current applied to a motor.

Another embodiment of the present invention is directed to a motor initialization method and apparatus for an electric booster brake system, which reads a motor position stored in a previous operation so as to perform motor initialization when a battery voltage is in a low-voltage state, and optimizes a brake pressure assist value during engine start, thereby minimizing the consumption of current applied to a motor.

In one embodiment, a motor initialization method for an electric booster brake system may include: determining, by a control unit, whether a key on signal of a vehicle is inputted; turning on a warning light and determining a battery voltage state of the vehicle, when the key on signal is inputted; and performing a motor initialization mode according to the determined battery voltage state.

The determining of whether the key on signal of the vehicle is inputted may include determining whether the key on signal is inputted, based on a door open signal inputted through a door sensing unit or a brake light signal (BLS) signal inputted through a brake state sensing unit.

The performing of the motor initialization mode may include reading a stored motor position value so as to perform the motor initialization mode, when the determined battery voltage is less than a required voltage.

The performing of the motor initialization mode may include: determining whether a brake-related signal is inputted through a brake state sensing unit, when the determined battery voltage is equal to or more than the required voltage; and driving a motor to initialize the position of the motor and performing the motor initialization mode, when the brake-related signal is not inputted.

The motor initialization method may further include: determining whether a start signal for the vehicle is inputted, when the motor initialization mode is normally performed; determining whether a charging system of the vehicle is normally operated, when it is determined that the start signal was inputted; and turning off the warning light after a preset time and operating the electric booster brake system, when it is determined that the charging system is normally operated.

The stored motor position value may include an average of motor position values stored in a storage unit at a preset interval of time from the time at which the key off signal is inputted to the time at which the operation of the electric booster brake system is turned off.

In another embodiment, a motor initialization apparatus for an electric booster brake system may include: a warning light; a battery voltage sensing unit configured to sense a battery voltage state of a vehicle; and a control unit configured to determine whether a key on signal for the vehicle is inputted, turn on the warning light when the key on signal is inputted, and perform a motor initialization mode based on the battery voltage state of the vehicle, provided from the battery voltage sensing unit.

When determining whether the key on signal for the vehicle is inputted, the control unit may determine whether the key on signal is inputted, based on a door open signal inputted through a door sensing unit or a BLS signal inputted through a brake state sensing unit.

When performing the motor initialization mode according to the determined battery voltage state, the control unit may read a stored motor position value to perform the motor initialization mode in case where the determined battery voltage is less than a required voltage.

When performing the motor initialization mode according to the determined battery voltage state, the control unit may determine whether a brake-related signal is inputted through a brake state sensing unit in case where the determined battery voltage is equal to or more than a required voltage, and drive a motor to initialize the position of the motor and perform the motor initialization mode in case where the brake-related signal is not inputted.

When the motor initialization mode is normally performed, the control unit may determine whether the start signal for the vehicle is inputted, when determining that the start signal was inputted, the control unit may determine whether a charging system of the vehicle is normally operated, and when the charging system is normally operated, the control unit may turn off the warning light after a preset time and operates the electric booster brake system.

The stored motor position value may include an average of motor position values stored in a storage unit at a preset interval of time from the time at which the key off signal is inputted to the time at which the operation of the electric booster brake system is turned off.

In accordance with the embodiments of the present invention, the motor initialization method and apparatus for an electric booster brake system may apply a different initialization mode depending on the battery voltage state when the electric booster brake system is operated, thereby minimizing the consumption of current applied to the motor.

Furthermore, when the electric booster brake system is operated, the battery voltage state may be checked. When the battery is in a low-voltage state, the motor position stored during a previous operation may be read to perform the motor initialization. Furthermore, when the vehicle is initially started, the brake pressure assist value may be optimized to normally start the vehicle even through a minimum current applied to the motor, which makes it possible to maximize user's satisfaction.

BRIEF DESCRIPTION OF THE DRAWINGS

FIG. 2 is a block configuration diagram illustrating a motor initialization apparatus for an electric booster brake system in accordance with an embodiment of the present invention.

FIG. 3 is a flowchart illustrating a motor initialization method for an electric booster brake system in accordance with an embodiment of the present invention.

DESCRIPTION OF SPECIFIC EMBODIMENTS

Figure 1:
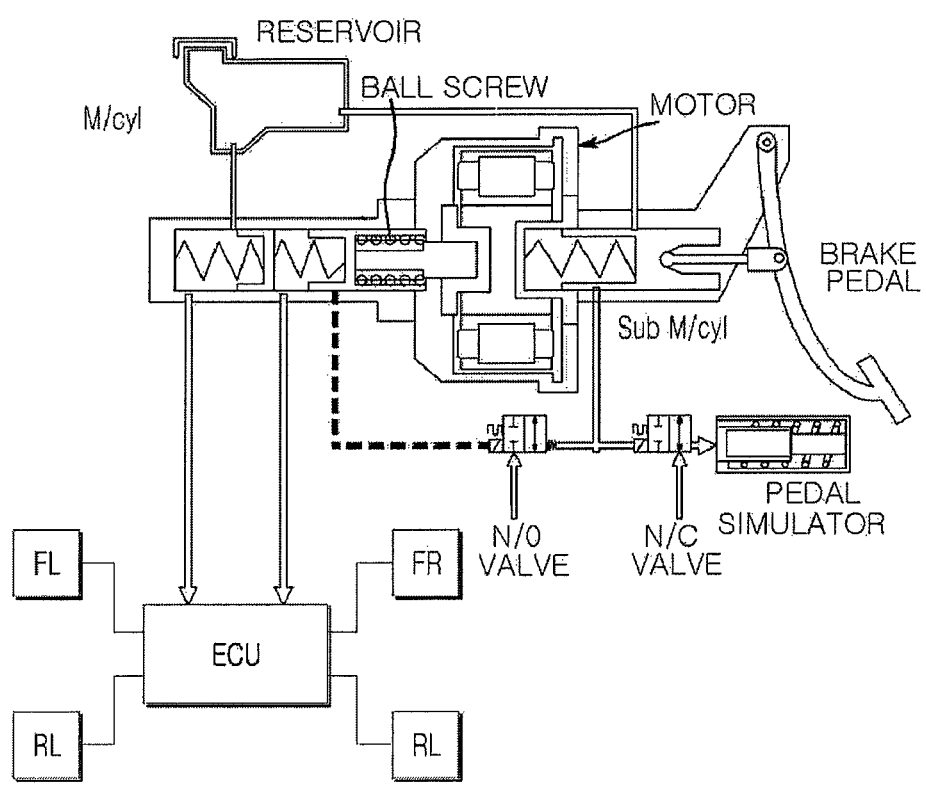
FIG. 1 is a diagram illustrating the configuration of an electric booster brake system.

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

FIG. 1 is a diagram illustrating the configuration of an electric booster brake system.

Referring to FIG. 1, the electric booster brake system may include a motor and a main master cylinder M/cyl for forming front-rear wheel brake pressure, a sub master cylinder S/cyl and a pedal simulator for forming a pedal force of a driver, solenoid valves (N/O and N/C valves) for opening and closing a flow path, a pedal stroke sensor, an electronic control unit (ECU) for controlling the motor, a pedal simulator, and a reservoir.

When a key on signal is inputted, the electric booster brake system may check whether electric booster power is normally inputted, supply main power to the electric booster, check whether a system input/output state is normal, initialize the position of the motor, and perform an operation according to a requested braking force of a driver.

Furthermore, when the driver steps on a pedal, the electric booster brake system may receive a pedal displacement sensed through the pedal stroke sensor and pressure values from pressure sensors installed in the main master cylinder and the sub master cylinder, respectively, set the requested braking force of the driver, and drive the motor to brake front and rear wheels according to the requested braking force of the driver.

Thus, the present invention provides a motor initialization method for an electric booster brake system, which is capable of minimizing the consumption of current applied to the motor by applying a different motor initialization mode depending on a battery voltage state, when the electric booster brake system is operated.

The motor initialization method for an electric booster brake system will be described in detail as follows.

FIG. 2 is a block configuration diagram illustrating a motor initialization apparatus for an electric booster brake system in accordance with an embodiment of the present invention.

Referring to FIG. 2, the motor initialization apparatus for an electric booster brake system in accordance with the embodiment of the present invention may include a door sensing unit 10, a brake state sensing unit 20, a battery voltage sensing unit 30, a vehicle tilt sensing unit 40, a storage unit 50, a control unit 70, a warning light 80, and a motor 90.

The door sensing unit 10 may sense an open/close state of a door operated by a driver.

The brake state sensing unit 20 may sense whether a brake light signal (BLS) signal based on a brake pedal manipulation of the driver is inputted and whether a signal is inputted from a pedal angle sensor, a master cylinder pressure sensor, or a sub master cylinder pressure sensor.

The battery voltage sensing unit 30 may sense a voltage state of a battery.

The vehicle tilt sensing unit 40 may sense a vehicle tilt, and sense a vehicle tilt value through a yaw sensor.

The storage unit 50 may store an average value of position values of the motor 90 at a preset interval of time from the time at which a key off signal is inputted to the time at which the electric booster brake system is turned off.

More specifically, when a brake pedal-related signal (for example, the BLS signal or the signal from the pedal angle sensor, the master cylinder pressure sensor, or the sub master cylinder pressure sensor) is not inputted through the brake state sensing unit 20, but an electric booster brake system operation off signal (for example, IGN OFF and engine RPM=0) is inputted and a close signal is inputted through the door sensing unit 10 after the door is opened, it may indicate that the driver has no intention to drive the vehicle.

When such a state is maintained for a predetermined time, the position of the motor 90 may be stored at the preset interval of time while latch is performed after the electric booster brake system is turned off. Then, when the operation of the electric booster brake system is completely turned off after the latch is ended, an average value of the stored motor position values may be finally stored in the storage unit 50.

At this time, the storage unit 50 may include EEPROM (Electrically Erasable Programmable Read-Only Memory) which is a nonvolatile memory.

The control unit 70 may determine whether a key on signal is inputted, based on the door open signal inputted through the door sensing unit 10 or the BLS signal inputted through the brake state sensing unit 20.

At this time, when the key on signal is inputted, the control unit 70 may turn on the warning light 80, and monitor a vehicle battery voltage through the battery voltage sensing unit 30 while power is supplied to a controller of the electric booster.

Furthermore, the control unit 70 may compare the vehicle battery voltage monitored through the battery voltage sensing unit 30 to a required voltage, and control the motor 90 by performing a motor initialization mode according to the comparison result.

When the vehicle battery voltage monitored through the battery voltage sensing unit 30 is less than the required voltage, the control unit 70 may read the average of the motor position values stored in the storage unit 50, and perform the motor initialization mode.

That is, when the vehicle battery voltage is lower than the reference value, the control unit 70 may read the average of the motor position values so as to initialize the motor, instead of an existing motor initialization mode.

Furthermore, the control unit 70 may optimize a brake pressure assist value during engine start, which corresponds to pressure when the driver steps on the brake pedal during engine start after a stop, according to the vehicle tilt value sensed through the vehicle tilt sensing unit 40, and minimize the current applied to the motor 90 such that the system stably operates.

When the motor initialization mode is normally performed according to the vehicle battery voltage monitored through the battery voltage sensing unit 30, the control unit 70 may determine whether a start signal for the vehicle is inputted through the vehicle control unit 60. When the start signal is inputted, the control unit 70 may determine whether a charging system of the vehicle is normally operated, through the vehicle control unit 60.

At this time, when the charging system is normally operated, the control unit 70 may turn off the warning light 80 after a preset time.

That is, when the start signal is normally inputted (EV mode or engine start state) and the charging system is normally operated, the control unit 70 may turn off the warning unit 80, and normally operate the electric booster brake system.

As described above, the motor initialization apparatus for an electric booster brake system in accordance with the embodiment of the present invention may apply a different initialization mode depending on the battery voltage state when the electric booster brake system is operated, thereby minimizing the consumption of current applied to the motor.

Furthermore, when the electric booster brake system is operated, the motor initialization apparatus may check the battery voltage state. When the battery is in a low-voltage state, the motor initialization apparatus may read the motor position stored during a previous operation and perform the motor initialization. Furthermore, when the vehicle is initially started, the motor initialization apparatus may optimize the brake pressure assist value to normally start the vehicle even through a minimum current applied to the motor, thereby maximizing user's satisfaction.

FIG. 3 is a flowchart illustrating a motor initialization method for an electric booster brake system in accordance with an embodiment of the present invention. Referring to FIG. 3, the motor initialization method for an electric booster brake system will be described in detail.

First, the control unit 70 may determine whether a key on signal for a vehicle is inputted, at step S10.

At this time, whether the key on signal is inputted may be determined from a door open signal inputted through the door sensing unit 10 or a BLS signal inputted through the brake state sensing unit 20.

More specifically, when a driver opens a driver seat door in a state where the electric booster brake system is turned off or when the driver turns off the ignition and steps on a brake pedal in the vehicle while latch is performed after the electric booster brake system is turned off, the door open signal or BLS signal may be inputted to determine whether the key on signal was inputted.

When it is determined at step S10 that the key on signal was inputted, the control unit 70 may turn on the warning light 80 at step S20.

More specifically, when the key on signal is inputted, the control unit 70 may supply power to a controller (not illustrated) of the electric booster brake system, and monitor a vehicle battery voltage through the battery voltage sensing unit 30.

That is, the control unit 70 may compare the vehicle battery voltage monitored through the battery voltage sensing unit 30 to a required voltage, and perform the motor initialization mode according to the comparison result, at step S30.

At this time, when the vehicle battery voltage monitored through the battery voltage sensing unit 30 is less than the required voltage, the control unit 70 may read a position value of the motor 90, stored in the storage unit 50, and perform the motor initialization mode at step S40.

The motor initialization mode at this time may be referred to as a mode 1, for convenience of description.

In the mode 1, when a start signal for the vehicle is inputted, the control unit 70 may read a position value of the motor 90, which had been stored in the storage unit 50 when the electric booster brake system is turned off at a previous cycle.

At this time, the position value of the motor 90 may include an average of position values of the motor 90, which are stored in the storage unit 50 at a preset interval of time from the time at which a key off signal is inputted to the time at which the electric booster brake system is turned off.

More specifically, when a brake pedal-related signal (for example, the BLS signal or the signal from the pedal angle sensor, the master cylinder pressure sensor, or the sub master cylinder pressure sensor) is not inputted through the brake state sensing unit 20, but an electric booster brake system operation off signal (for example, IGN OFF and engine RPM=0) is inputted and a close signal is inputted through the door sensing unit 10 after the door is opened, it may indicate that the driver has no intention to drive the vehicle.

When such a state is maintained for a predetermined time, the position of the motor 90 may be stored at the preset interval of time while latch is performed after the electric booster brake system is turned off. Then, when the operation of the electric booster brake system is completely turned off after the latch is ended, an average value of the stored motor position values may be finally stored in the storage unit 50, and become the position value of the motor 90.

The control unit 70 may read the position value of the motor 90, stored in the storage unit 50, and initialize the motor 90.

That is, when the battery voltage is lower than a reference value, the control unit 70 may read the position value of the motor 90, stored in the storage unit 50, and initialize the motor 90, instead of driving the motor 90 to initialize the position of the motor 90.

Furthermore, according to a vehicle tilt value sensed through the vehicle tilt sensing unit 40, the control unit 70 may optimize a brake pressure assist value during engine start, which corresponds to pressure when the driver steps on the brake pedal during engine start after a stop, according to the vehicle tilt value sensed through the vehicle tilt sensing unit 40, and minimize the current applied to the motor 90 such that the system stably operates.

Then, when the vehicle battery voltage monitored through the battery voltage sensing unit 30 is equal to or more than a required voltage, the control unit 70 may determine whether a brake-related signal is inputted through the brake state sensing unit 20, at step S31. When the brake-related signal is not inputted, the control unit 70 may supply power to the motor 90 so as to drive the motor 90 at step S32, and perform the motor initialization mode by initializing the position of the motor 90 at step S33.

At this time, the motor initialization mode when the brake-related signal is inputted may be referred to as a mode 2, and the motor initialization mode when no brake-related signal is inputted may be referred to as a mode 3.

The mode 2 may indicate a state in which a driver steps on a brake pedal and thus motor initialization is not performed, and the mode 3 may include a state in which the battery voltage is equal to or more than the required voltage and thus an existing motor initialization mode is performed.

The mode 3 will be described in detail as follows. First, when a key on signal is normally inputted, the warning light 80 may be turned on, the electric booster brake system may be turned on to supply main power, and power may be supplied to the motor 90.

Then, when the motor 90 is driven to initialize the position of the motor 90 to a position at which braking pressure is zero, the motor initialization may be normally completed to turn off the warning light 80. When the initialization fails, the control unit 70 may maintain the on state of the warning light 80 and enter a backup mode.

When the electric booster brake system is normally operated, the control unit 70 may determine a requested braking force of the driver from a pedal displacement and the pressure sensor, control front-rear wheel braking pressure according to a brake strategy, and turn off the electric booster brake system. When latch is ended, the operation of the electric booster brake system is completely turned off.

When the motor initialization mode (mode 1, 2, or 3) is normally performed according to the vehicle battery voltage monitored through the battery voltage sensing unit 30, the control unit 70 may determine whether a start signal for the vehicle is inputted through the vehicle control unit 60, at step S50.

When it is determined at step S50 that the start signal was inputted, the control unit 70 may determine whether the charging system of the vehicle is normally operated through the vehicle control unit 60, at step S60.

When it is determined at step S60 that the charging system is normally operated, the control unit 70 may turn off the warning light 80 after a preset time, at step S70.

That is, when the start signal is normally inputted (EV mode or engine start state) and the charging system is normally operated, the control unit 70 may turn off the warning light 80 after the preset time.

Then, the control unit 70 may normally operate the electric booster brake system at step S80.

As described above, the motor initialization method for an electric booster brake system in accordance with the embodiment of the present invention may apply a different initialization mode depending on the battery voltage state when the electric booster brake system is operated, thereby minimizing the consumption of current applied to the motor.

Furthermore, when the electric booster brake system is operated, the battery voltage state may be checked. When the battery is in a low-voltage state, the motor position stored during a previous operation may be read to perform the motor initialization. Furthermore, when the vehicle is initially started, the brake pressure assist value may be optimized to normally start the vehicle even through a minimum current applied to the motor, which makes it possible to maximize user's satisfaction.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method of initializing a motor-driven electric brake system of a vehicle when starting the vehicle, the method comprising:
   receiving, from a driver, a vehicle starting input for starting the vehicle from a stopped state;
   subsequently determining a voltage level of a main battery of the vehicle; and
   subsequently, based on the determined voltage level, conducting initialization of the motor-driven electric brake system prior to ignition of an engine of the vehicle,
   wherein when the determined voltage level of the main battery is higher than a predetermined value, the initialization comprises driving a brake motor of the motor-driven electric brake system for motor position initialization,
   whereas when the determined voltage level of the main battery is lower than the predetermined value, the initialization comprises utilizing a stored value instead of driving the brake motor for motor position initialization such that consumption of electricity from the main battery is minimized in initializing the motor-driven electric brake system prior to ignition of the engine.

2. The method of claim 1, further comprising, subsequent to receiving the vehicle starting input, determining a door of the vehicle is open.

3. The method of claim 1, further comprising:
   determining whether a brake-related signal is inputted when the voltage level is equal to or higher than the predetermined value; and
   wherein the method skips initialization of the motor-driven electric brake system when determined that a brake-related signal is inputted.

4. The method of claim 1, further comprising:
   determining whether a charging system of the vehicle is normally operating; and
   operating the motor-driven electric brake system when it is determined that the charging system is normally operating.

5. The method of claim 1, wherein the stored value is obtained based on a state of the brake motor of the motor-driven electric brake system while the vehicle was being last stopped, specifically between a driver's input for turning off the vehicle and turn-off of the motor-driven electric brake system.

6. A vehicle, comprising:
an engine;
a main battery;
a motor-driven electric brake system comprising a brake motor; and
a control unit configured:
   to determine whether the main battery's voltage level is higher or lower than a predetermined value, and
   to control initialization of the motor-driven electric brake system based on the determination,
   wherein when the main battery's voltage level is higher than the predetermined value, the control unit causes driving of the brake motor for motor position initialization,
   whereas when the main battery's voltage level is lower than the predetermined value, a stored value is utilized instead of driving of the brake motor for motor position initialization such that consumption of electricity from the main battery is minimized in initializing the motor-driven electric brake system prior to ignition of the engine.

7. The vehicle of claim 6, wherein the control unit is further configured to, subsequent to receiving the vehicle starting input, determine a door of the vehicle is open.

8. The vehicle of claim 6, wherein the control unit is further configured:
   to determine whether a brake-related signal is inputted when the voltage level is equal to or higher than the predetermined value, and
   to skip initialization of the motor-driven electric brake system when determined that the brake-related signal is inputted.

9. The vehicle of claim 6, wherein the control unit is further configured:
   to determine whether a charging system of the vehicle is normally operating, and
   when the charging system is normally operated, to operate the motor-driven electric brake system.

10. The vehicle of claim 6, wherein the stored value is obtained based on a state of the brake motor of the motor-driven electric brake system while the vehicle was being last stopped, specifically between a driver's input for turning off the vehicle and turn-off of the motor-driven electric brake system.

* * * * *